United States Patent [19]

Saito et al.

[11] 4,357,565

[45] Nov. 2, 1982

[54] CONTROL APPARATUS FOR VARIABLE-SPEED REVERSIBLE MOTOR

[75] Inventors: Shigeki Saito, Katsuta; Osamu Koizumi, Ibarakimachi; Syoichi Kawamata, Hitachi, all of Japan

[73] Assignee: Hitachi, Ltd., Tokyo, Japan

[21] Appl. No.: 327,192

[22] Filed: Dec. 3, 1981

[30] Foreign Application Priority Data

Dec. 5, 1980 [JP] Japan .................. 55-170939

[51] Int. Cl.³ .............................. G05B 5/00
[52] U.S. Cl. ............................. 318/473; 318/471; 318/472; 318/334
[58] Field of Search ................. 105/59; 180/54 A; 310/52, 58, 68 C; 318/34, 66, 334, 471, 472, 473; 361/25, 26, 27; 340/588, 593, 594

[56] References Cited

U.S. PATENT DOCUMENTS

| | | | |
|---|---|---|---|
| 2,469,820 | 5/1949 | Fuge | 310/58 |
| 2,518,597 | 8/1950 | Brooks | 310/68 C |
| 3,079,524 | 2/1963 | Gibson et al. | 361/27 X |
| 3,794,896 | 2/1974 | Holt | 318/471 |

OTHER PUBLICATIONS

Walter C. Painter, "Blower Control Circuit", RCA Technical Notes, No. 646, Nov. 1965.

Primary Examiner—Ulysses Weldon
Attorney, Agent, or Firm—Antonelli, Terry & Wands

[57] ABSTRACT

Disclosed is an apparatus for controlling a motor unit including a variable-speed reversible main motor for driving a load and a subsidiary motor for driving a fan. The control apparatus comprises a temperature sensor circuit sensing the temperature of the main motor and generating a first output signal when the temperature of the main motor exceeds a first predetermined level, a second output signal when the main motor temperature exceeds a second predetermined level higher than the first predetermined level and a third output signal when the main motor temperature drops to a level lower than the first predetermined level, and a control circuit connected to the temperature sensor circuit for energizing the subsidiary motor in response to the first output signal, deenergizing the main motor in response to the second output signal and deenergizing the subsidiary motor in response to the third output signal.

6 Claims, 5 Drawing Figures

CONTROL APPARATUS FOR VARIABLE-SPEED REVERSIBLE MOTOR

BACKGROUND OF THE INVENTION

1. Field of the Invention

This invention relates to the art of control of a variable-speed reversible motor, and more particularly to an apparatus for controlling a motor arrangement including a variable-speed reversible main motor for driving a load and a subsidiary motor for driving a fan. 2. Description of the Prior Art Generally, an electric motor connected to a heavy load to operate under a severe condition is arranged to be cooled by an external motor-driven blower. Further, it has been proposed a motor arrangement includes, besides a main motor, a fan-driving subsidiary motor which is disposed in coaxial relation with the rotary shaft of the main motor and is rotated independently of the rotation of the main motor, as disclosed in, for example, German Pat. No. 1,112,782. The fan-drive subsidiary motor of this kind can supply cooling air of constant amount regardless of the rotation speed of the main motor. Therefore, such a motor arrangement is preferably mounted on, for example, a battery-driven forklift truck which is repeatedly started and stopped for loading and unloading operation within a limited traveling range. However, in the case of a conventional battery-driven forklift truck, the external motor-driven blower starts to rotate at a constant speed in response to the turning-on of the key switch, regardless of whether or not the main motor is under rotation. More precisely, the motor-driven blower is energized to rotate as soon as the key switch is turned on at whatever position of the accelerator switch and is not deenergized unless the key switch is turned off, whereas the main motor would not be energized unless the key switch is turned on, and, then, the accelerator switch is turned on. This means that the fan is driven more than is required. Therefore, the vehicle, whose power source is the battery, has been encountered with the problem that the battery is considerably consumed, and the movable range of the vehicle is reduced. Further, the unnecessary drive of the fan, especially, under a cold condition or in a cold season has resulted in excessive cooling of the main motor, which is not desirable from the aspect of saving of energy too. Furthermore, the vehicle driver had to pay vigilant attention to the operating conditions of the main and subsidiary motors since, in the event that the external motor-driven blower or the fan-drive subsidiary motor arranged in coaxial relation with the main motor is disabled and rendered unable to perform its function for some unknown reason, the ambient temperature of the main motor shows an unusual rise until finally the main motor itself is rendered utterly unable to perform its primary function.

SUMMARY OF THE INVENTION

The present invention contemplates to obviate the aforementioned defects of the conventional motor arrangement.

It is a primary object of the present invention to provide a variable-speed reversible motor control apparatus which can make optimized control of the main motor and fan-drive motor in relation to the ambient temperature of the main motor.

In accordance with the present invention which attains the above object, there is provided an apparatus for controlling a motor arrangement including a variable-speed reversible main motor for driving a load and a subsidiary motor for driving a fan, the control apparatus comprising temperature sensor means for sensing the temperature of the main motor, the sensor means generating a first output signal when the temperature of the main motor exceeds a first predetermined level, a second output signal when the main motor temperature exceeds a second predetermined level higher than the first predetermined level and a third output signal when the main motor temperature drops to a level lower than the first predetermined level; and control means electrically connected to the temperature sensor means for energizing the subsidiary motor in response to the first ouput signal, deenergizing the main motor in response to the second output signal and deenergizing the subsidiary motor in response to the third output signal.

BRIEF DESCRIPTION OF THE DRAWINGS

The above and other objects, features and advantages of the present invention will become more apparent from the following detailed description of preferred embodiments of the present invention taken in conjunction with the accompanying drawings, in which.

DESCRIPTION OF THE PREFERRED EMBODIMENTS

Preferred embodiments of the present invention will now be described in detail with reference to the drawings.

Figure 1:
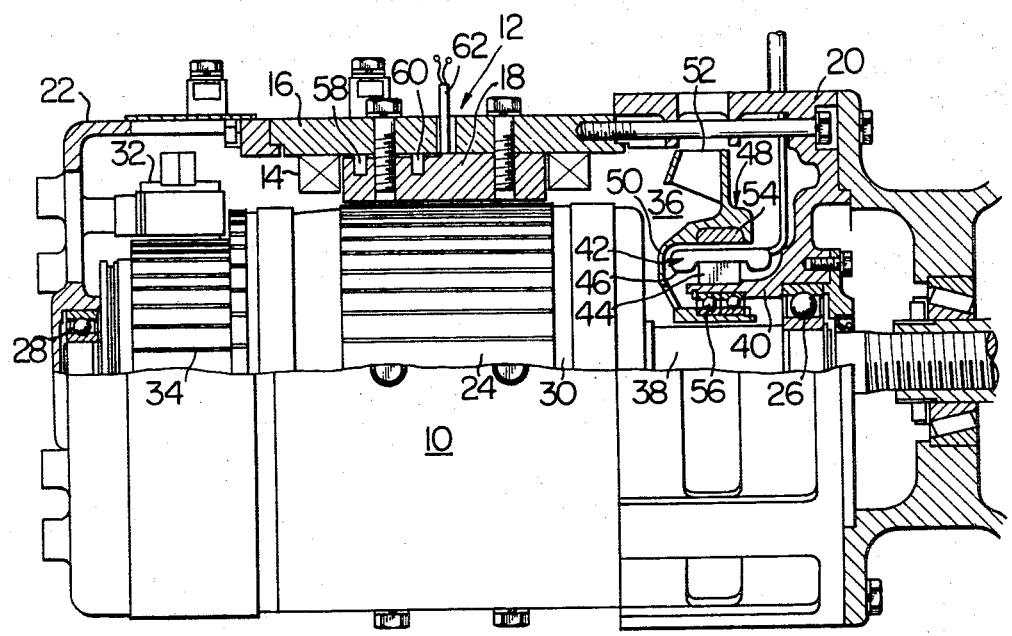
FIG. 1 is a front elevation view, with the radially upper half thereof being shown in section, of a motor arrangement including a variable-speed reversible main motor and a fan-drive motor controlled by an embodiment of the control apparatus according to the present invention.

Referring first to FIG. 1, a main motor for driving a load is generally designated by the reference numeral 10, and its stator part 12 includes a field core 18 having a field coil 14 wound therearound and fixed to the inner peripheral face of a yoke 16, and a front bracket 20 and a rear bracket 22 fitted on and fixed to the opposite end faces respectively of the yoke 16. A rotor part 24 is rotatably supported between the front and rear brackets 20 and 22 with the rotor shaft 38 being journaled in a pair of ball bearings 26 and 28. The rotor 24 includes an armature coil 30 to which armature current is supplied from a brush 32 through a commutator 34.

A subsidiary motor for driving a cooling fan is generally designated by the reference numeral 36 and comprised of a cylindrical supporting portion 40 extending axially inwardly from the front bracket 20 to cover part of the rotor shaft 38, a stator part 42 fixed to the radially outer face of the cylindrical supporting portion 40 and including a stator core 44 and a stator coil 46, and a rotor part 48 disposed opposite to the stator part 42 with an air gap defined therebetween. The rotor part 48 includes a generally cup-shaped rotary frame 50 of such a material as aluminum, a cooling fan 52 formed on the outer peripheral end of the rotary frame 50 in integral relation therewith, and a solid ring 54 buried in the inner peripheral face of the rotary frame 50 opposite to the stator core 44. The rotor part 48 is supported on the cylindrical supporting portion 40 with a ball bearing 56 interposed therebetween.

Figure 2:
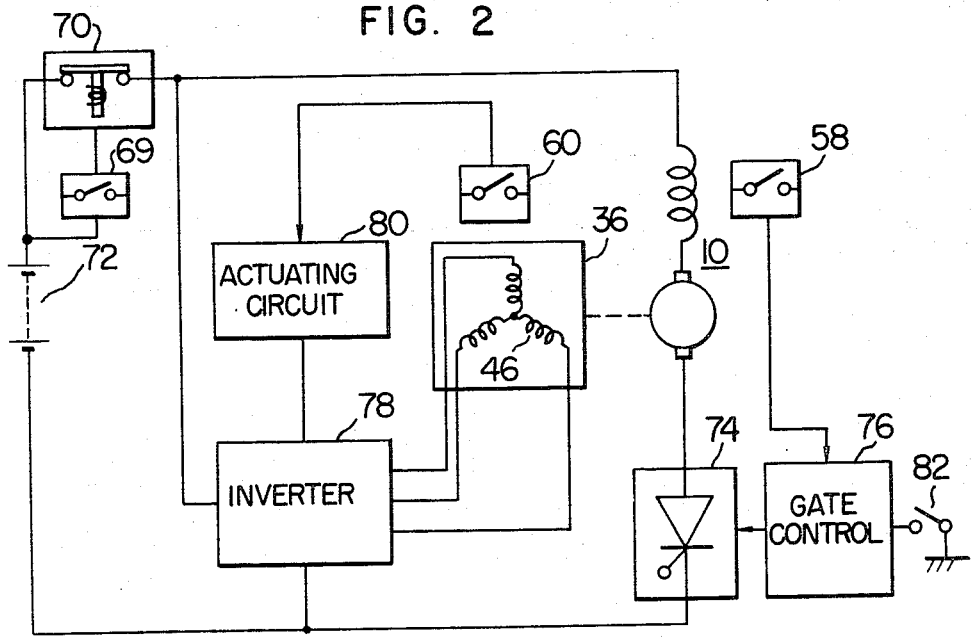
FIG. 2 is a circuit diagram of the variable-speed reversible motor control apparatus embodying the present invention.

A first bimetal type temperature sensor 58 for sensing high temperatures and a second bimetal type temperature sensor 60 for sensing low temperatures are buried in a portion of the field core 18 of the main motor 10, and their output terminals are connected to leads 62 which extend to the exterior of the yoke 16 to be connected to a control circuit disposed externally of the main motor 10 as shown in FIG. 2.

Referring now to FIG. 2 showing a control circuit as an embodiment of the present invention in the case the invention is applied to a vehicle such as a forklift truck, one terminal of the main motor 10 is connected to the positive terminal of a battery 72 through a main switch 70 which is on-off controlled by a key switch 69 of the vehicle not shown, and the other terminal of the main motor 10 is connected to the negative terminal of the battery 72 through a speed control circuit 74 which is, for example, a known thyristor chopper. A known gate control circuit 76 is connected to the thyristor chopper type speed control circuit 74. A known inverter 78 is connected across the battery 72 through the main switch 70 in order to supply power to the stator coil 46 of the fan-drive motor 36. The output terminal of the temperature sensor 58 for high-temperature sensing purpose is connected directly to the gate control circuit 76, and the output terminal of the temperature sensor 60 for low-temperature sensing purpose is connected to the inverter 78 through an actuating circuit 80 which acts to turn on-off the inverter 78. The gate control circuit 76 is connected to a switch 82 which operates in interlocking relation with the accelerator pedal of the vehicle.

Figure 3:
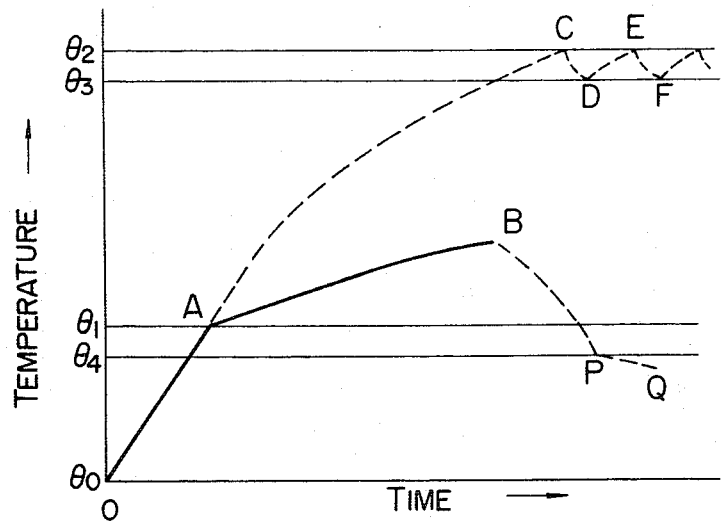
FIG. 3 is a graph schematically showing the operating points of the low-temperature and high-temperature sensors employed in the embodiment of the present invention.

The operation of the control apparatus embodying the present invention will now be described with reference to FIGS. 2 and 3.

In the arrangement shown in FIG. 2, when the key switch 69 and hence the main switch 70 is turned on, the main motor 10 and the fan-drive motor 36 are ready for starting. Then, when the accelerator switch 82 is turned on to actuate the gate control circuit 76, the thyristor chopper type speed control circuit 74 is turned on to energize the main motor 10. Suppose, at this time, the ambient temperature of the main motor 10, sensed by the temperature sensor 60 for low-temperature sensing purpose exceeds a first predetermined level $\theta_1$ shown in FIG. 3. Then, since the temperature sensor 60 has already been turned on, the fan actuating circuit 80 is turned on to actuate the inverter 78, and the fan-drive motor 36 is energized and starts to operate. On the other hand, when the sensed ambient temperature of the main motor 10 is at a level $\theta_0$ lower than the first predetermined level $\theta_1$ shown in FIG. 3, the temperature sensor 60 is in its off state, and the fan actuating circuit 80 does not operate. Consequently, the inverter 78 does not energize the fan-drive motor 36. The fan-drive motor 36 would not be energized until the ambient temperature of the main motor 10 rises from the level $\theta_0$ to attain the first predetermined level $\theta_1$ and the temperature sensor 60 is turned on. With the rotation of the main motor 10, the ambient temperature of the main motor 10 rises progressively along a temperature curve OA in FIG. 3 until it attains the first predetermined level $\theta_1$. At this moment, the temperature sensor 60 is turned on to energize the fan-drive motor 36, and, thereafter, the gradient of the ambient temperature rise becomes gentle. For example, the temperature rises along an up curve AB. The ambient temperature of the main motor 10 rises in the manner above described when the main motor 10 is operating in the so-called steady state. Thus, when the main motor 10 operates in the steady state, the cooling fan 52 operates effectively within the temperature range above described thereby preventing a sharp rise of the ambient temperature of the main motor 10 even if the main motor 10 is continuously placed under an overloaded condition. The temperature sensor 58 for high-temperature sensing purpose is turned on when the fan-drive motor 36 is disabled or rendered unable to rotate for some unknown reason, and the ambient temperature of the main motor 10 rises sharply along, for example, an up curve AC until it attains a second predetermined level $\theta_2$ which is, for example, about 140° C. It is desirable to select this level $\theta_2$ to be high but not beyond bounds of burn damage of the motor. In response to the turning-on of the temperature sensor 58, the gate control circuit 76 acts to turn off the thyristor chopper type speed control circuit 74 thereby deenergizing the main motor 10 or forcedly stopping the rotation of the main motor 10 to prevent any further temperature rise. The temperature sensor 58, which is of the bimetal type, would not be immediately turned off even when the ambient temperature drops to a level lower than the second predetermined level $\theta_2$. This temperature sensor 58 is turned off when the ambient temperature of the main motor 10 drops along a temperature curve CD until it reaches, for example, a level $\theta_3$ which is, for example, about 110° C. At this moment, the thyristor chopper type speed control circuit 74 energizes the main motor 10 again. Thus, when the operation is continued without the energization of the fan-drive motor 36, that is, without eliminating the source of trouble inhibiting the rotation of the fan-drive motor 36, the ambient temperature of the main motor 10 will oscillate while following a temperature curve C-D-E-F- —between the temperature levels $\theta_2$ and $\theta_3$.

The ambient temperature of the main motor 10 may progressively rise to attain the second predetermined level $\theta_2$ for another unknown reason in spite of the fact that the fan-drive motor 36 is normally rotating. It is apparent that, in such a case too, the manner of control is similar to that above described.

Further, the arrangement may be such that, as will be described later with reference to FIG. 4, when the ambient temperature of the main motor 10 attains the first predetermined level $\theta_2$ and the temperature sensor 58 is turned on to consequently turn off the gate control circuit 76 regardless of whether or not the fan-drive motor 36 is normal or trouble-free, the gate control circuit 76 would not be turned on until inspection for detecting and removing the source of serious trouble, if any, is completed, even when the temperature sensor 58 is turned off due to the temperature drop from the level $\theta_2$.

The temperature difference between $\theta_2$ and $\theta_3$ is determined by the hysteresis characteristic of the bimetal type temperature sensor 58 and is, for example, about 30° C.

Furthermore, when the ambient temperature of the main motor 10 drops to, for example, a level $\theta_4$ along a temperature curve BP as when, for example, the main motor 10 ceases to rotate, the temperature sensor 60 is turned off, and, thereafter, the temperature drops gently from the level $\theta_4$ as shown by a curve PQ. The level $\theta_1$ is preferably about 60° C. As in the case of the temperature sensor 58, the temperature difference between $\theta_1$ and $\theta_4$ is determined by the hysteresis characteristic of the bimetal type temperature sensor 60 and is, for example, about 30° C.

Figure 4:
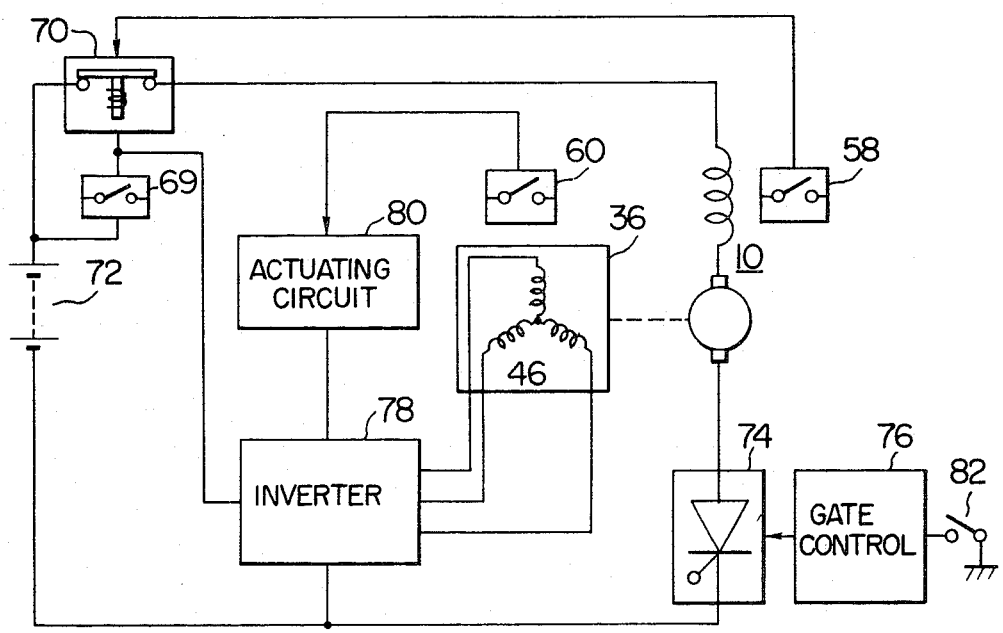
FIG. 4 is a circuit diagram of another embodiment of the variable-speed reversible motor control apparatus according to the present invention.

FIG. 4 shows a modification of the circuit structure of the control apparatus shown in FIG. 2. The circuit structure shown in FIG. 4 differs from that shown in FIG. 2 only in that the inverter 78 is connected to the key switch 69, instead of being connected to the main switch 70, so as to be capable of being connected to the battery 72 through the key switch 69, and that the output terminal of the temperature sensor 58 for high-temperature sensing purpose is connected to the main switch 70, instead of being connected to the gate control circuit 76, so as to control this main switch 70 instead of controlling the gate control circuit 76. The operation of the embodiment shown in FIG. 4 is such that, when the ambient temperature of the main motor 10 rises to attain the second predetermined level $\theta_2$ for some unknown reason as shown in FIG. 3, the temperature sensor 58 generates its output signal for turning off the main switch 70 in spite of the on-state of the key switch 69. Even when the ambient temperature drops from the level $\theta_2$ thereafter, the entire circuit remains in the off state until the main switch 70 is manually turned on again. Other aspects of the operation are entirely similar to those of the embodiment shown in FIG. 2, and any detailed description thereof will be unnecessary. In this embodiment, however, it is appreciated that the inverter 78 may of course be connected to the main switch 70 as in FIG. 2 embodiment, instead of being connected to the key switch 69, so as to allow the fan-drive motor 36 to be deenergized when the main switch 70 is turned off by the sensor 58.

Figure 5:
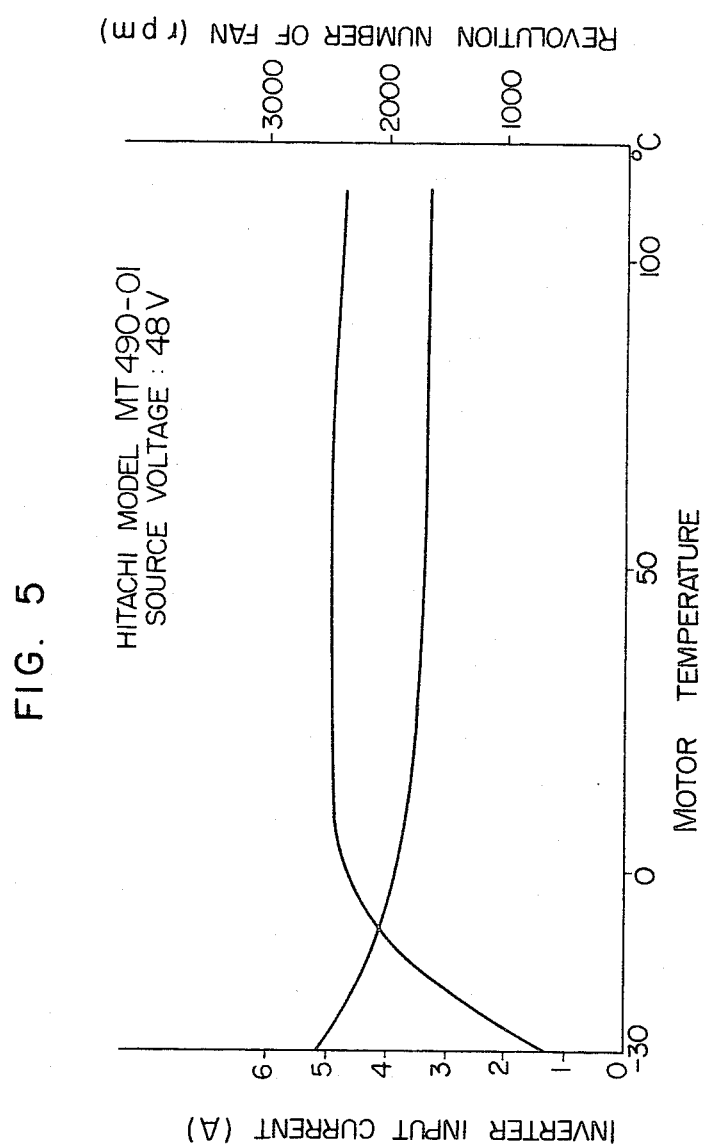
FIG. 5 is a graph showing the results of a test conducted to find the relation between the temperature of the main motor and the friction loss at the ball bearing of the fan-drive motor in the first embodiment of the present invention.

It is commonly known that the torque loss of the rotary part of a motor increases when the motor operates under a cold condition. In the case of a commutator motor such as the main motor 10 used in the aforementioned embodiments of the present invention, the wear on the brush increases also under such an operating condition, and it is therefore preferable that such a motor operates in a condition in which its temperature is not excessively high or low. When considered from the aspect of moisture removal, the temperature of the motor is preferably relatively high, and an ordinary motor is so designed as to permit a temperature rise up to a relatively high level in its steady state of operation when it operates in an atmosphere of room temperature. Therefore, in the starting stage of such a motor, it is unnecessary to cool the motor by cooling means such as a cooling fan until the temperature of the motor rises up to a relatively high level, and it is rather desirable to permit a natural temperature rise. This applies especially to the case in which the motor operates in a cold environment. Further, in the case of the embodiments of the present invention in which the main motor is frequently or repeatedly turned on-off, continuous energization of the fan-drive motor even during the off-period of the main motor leads to the loss of energy. It is therefore important to suitably select the values of $\theta_1$ and $\theta_4$ so as to determine the temperature level at which the fan-drive motor is energized in response to a rise of the temperature of the main motor. FIG. 5 is a graph showing the results of a test conducted on a motor model MT490-01, which is a product of Hitachi, Ltd., to find the fan rotation speed vs. motor temperature characteristic and the inverter input current vs. motor temperature characteristic. A 48-volts battery was used as the power source in the test. It will be seen from FIG. 5 that, at low temperatures, the rotation speed of the fan decreases, and the value of the inverter input current increases. This is because, at low temperatures, the viscosity of grease charged in the ball bearing 56 of the fan-drive motor 36 increases and the clearance of the ball bearing 56 decreases resulting in an increase in the torque loss. The above test results teach also that the level $\theta_4$ is desirably selected to be about 30° C. (hence, $\theta_1$ is about 60° C.,) as described in the first embodiment.

It will be understood from the foregoing detailed description of the preferred embodiments of the present invention that, although the temperature sensor for high-temperature sensing purpose is turned on to deenergize or stop the rotation of the main motor when the ambient temperature of the main motor rises up to a dangerous level for some unknown reason, the fan-drive motor continues to rotate independently of the main motor, so that the required duration of cooling can be greatly shortened compared with the prior art manner of cooling relying upon the natural cooling. Further, due to the fact that the fan-drive motor is also deenergized when the ambient temperature of the main motor drops to a predetermined level, any extra power is not consumed by the fan-drive motor, and the control apparatus of the present invention finds its useful application to a battery-driven vehicle such as a battery-driven forklift truck for which the saving of energy is required. Furthermore, trouble such as burn-out of, for example, the armature coil of the main motor can be reliably prevented before such a serious situation occurs due to the fact that the temperature sensor for high-temperature sensing purpose acts to interrupt power supply to the main motor in the event in which the fan-drive motor is disabled and the ambient temperature of the main motor rises up to a dangerous level. Moreover, due to the fact that the temperature sensor for low-temperature sensing purpose is connected through the fan actuating circuit to the inverter for turning on-off the switching means (not shown) in the inverter, any especial relay is not required compared with a conventional one in which such a relay is provided for disconnecting the input leads to the inverter. Therefore, the control apparatus of the present invention can be made compact in size compared with the prior art one.

In the aforementioned embodiments of the present invention, the temperature sensors for sensing high and low temperatures are of the bimetal type and are buried in the field core of the main motor. However, these temperature sensors may be replaced by a combination of thermistors and suitable switching circuits, relays or the like, or by those of reed relay type. In such a case, the sensors do not show any hysteresis characteristic unlike those of the bimetal type, except that the sensors composed of the switching circuits, relays or the like (not shown) combined with thermistors (not shown) or the sensors of the reed relay type (not shown) operate with a delay time. Thus, the temperature difference between $\theta_1$ and $\theta_4$ as well as that between $\theta_2$ and $\theta_3$ is substantially zero, and $\theta_4$ and $\theta_3$ substantially overlap $\theta_1$ and $\theta_2$ respectively. In such a case, therefore, a phenomenon will occur in which the temperature sensors for sensing high and low temperatures are repeatedly turned on-off at short time intervals at the temperature levels $\theta_1$ and $\theta_2$ respectively. When such repeated on-off will give rise to fatigue or like trouble of the relay contacts, two pairs of sensors of the thermistor type or of the reed relay type may be provided to function as the temperature sensors for high and low temperature sensing purposes respectively, and the levels $\theta_1$, $\theta_4$ and $\theta_2$, $\theta_3$ may be discretely set respectively.

In the aforementioned embodiments of the present invention, the temperature sensors for high and low temperature sensing purposes are illustrated to be buried in the field core of the main motor. However, the mounting position of these temperature sensors is in no way limited to the specific position described above, and they may be mounted on, for example, the brush holder of the commutator. In summary, the requirement is that a suitable location should be selected depending on the type and operating condition of the temperature sensors so that the temperature sensors can shown a very good response to the temperature.

Although the aforementioned embodiments have been described with reference to the application of the present invention to a battery-driven forklift truck by way of example, the present invention is in no way limited to such a specific application, and it is apparent that the present invention is equally effectively applicable to the control of a motor which is provided with a fan and to which power is supplied from a commercial AC source.

We claim:

1. An apparatus for controlling a variable-speed reversible motor arrangement comprising:
   a variable-speed reversible main motor for driving a load;
   a subsidiary motor for driving a fan, said subsidiary motor being disposed in coaxial relation with the rotor shaft of said main motor and making controlled rotation independently of the rotation of said main motor;
   temperature sensor means for sensing a temperature of said main motor, said sensor means generating a first output signal when the temperature of said main motor exceeds a first predetermined level, a second output signal when the temperature of said main motor exceeds a second predetermined level higher than said first predetermined level and a third output signal when the temperature of said main motor drops to a level lower than said first predetermined level; and
   control means electrically connected to said temperature sensor means for energizing said subsidiary motor in response to said first output signal, deenergizing said main motor in response to said second output signal and deenergizing said subsidiary motor in response to said third output signal.

2. A control apparatus as claimed in claim 1, wherein said control apparatus further comprises power source means, and said control means includes first switching means capable of simultaneous on-off control of power supplied from said power source means to said main motor and said subsidiary motor, second switching means capable of on-off control of power supplied to said main motor only, first control circuit means for controlling the operation of said second switching means in response to said second output signal, and second control circuit means for controlling the power supply to said subsidiary motor in response to said first and third output signals.

3. A control apparatus as claimed in claim 1, wherein said control apparatus further comprises power source means, and said control means includes first switching means capable of simultaneous on-off control of power supplied from said power source means to said main motor and said subsidiary motor, second switching means capable of on-off control of power supplied to said main motor only, first control circuit means for controlling the operation of said second switching means, and second control circuit means for controlling the power supply to said subsidiary motor in response to said first and third output signals, said first switching means being turned off in response to said second output signal.

4. A control apparatus as claimed in claim 2, wherein said temperature sensor means generates a fourth output signal when the temperature of said main motor drops to a level lower than said second predetermined level, and said first control circuit means controls the operation of said second switching means in response to said second and fourth output signals.

5. A control apparatus as claimed in claim 2, 3 or 4, wherein said main motor is a DC motor, said subsidiary motor is an induction motor, said power source means is a DC power source, and said second circuit means includes inverter means for supplying power from said DC power source to said induction motor and actuating circuit means for controlling the operation of said inverter means in response to said second and third output signals.

6. A control apparatus as claimed in claim 4, wherein said temperature sensor means includes a first temperature sensor of bimetal type generating said first and third output signals, and a second temperature sensor of bimetal type generating said second and fourth output signals.

* * * * *